United States Patent
Benisty

(10) Patent No.: US 11,599,481 B2
(45) Date of Patent: Mar. 7, 2023

(54) ERROR RECOVERY FROM SUBMISSION QUEUE FETCHING ERRORS

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 390 days.

(21) Appl. No.: 16/712,730

(22) Filed: Dec. 12, 2019

(65) Prior Publication Data

US 2021/0182219 A1 Jun. 17, 2021

(51) Int. Cl.
| | |
|---|---|
| *G06F 11/00* | (2006.01) |
| *G06F 13/16* | (2006.01) |
| *G06F 13/42* | (2006.01) |
| *G06F 11/10* | (2006.01) |
| *G06F 3/06* | (2006.01) |
| *G06F 11/14* | (2006.01) |

(52) U.S. Cl.
CPC ........ *G06F 13/1668* (2013.01); *G06F 3/0604* (2013.01); *G06F 3/0659* (2013.01); *G06F 3/0679* (2013.01); *G06F 11/1068* (2013.01); *G06F 11/1474* (2013.01); *G06F 13/4282* (2013.01); *G06F 2201/82* (2013.01); *G06F 2213/0026* (2013.01)

(58) Field of Classification Search
CPC .. G06F 13/1668; G06F 3/0604; G06F 3/0659; G06F 11/1068; G06F 11/1474; G06F 2213/0026
See application file for complete search history.

(56) References Cited

U.S. PATENT DOCUMENTS

| | | | |
|---|---|---|---|
| 6,609,161 B1 | 8/2003 | Young | |
| 6,753,869 B2 | 6/2004 | Andres et al. | |
| 7,133,940 B2 | 11/2006 | Blightman et al. | |
| 7,296,108 B2 | 11/2007 | Beukema et al. | |
| 8,225,052 B2 | 7/2012 | Galbo et al. | |

(Continued)

OTHER PUBLICATIONS

NVM Express, Inc., "NVM Express, Base Specification, Revision 1.4," Jun. 10, 2019, retrieved at "https://nvmexpress.org/wp-content/uploads/NVM-Express-1_4-2019.06.10-Ratified.pdf." (Year: 2019).*

(Continued)

*Primary Examiner* — Philip Guyton
(74) *Attorney, Agent, or Firm* — Patterson + Sheridan, LLP; Steven H. VerSteeg

(57) ABSTRACT

An apparatus includes a non-volatile memory media and a storage controller. The storage controller is configured to fetch a storage command from a submission queue of a host. The submission queue has a submission queue identifier (SQID). The storage controller then determines a submission queue fetch error in response to receiving a Transport Layer Packet (TLP) error as a result of fetching the storage command. Next, the storage controller is configured to determine a command identifier (CID) for the storage command associated with the submission queue fetch error. The storage controller then sends a completion message to the host. The completion message uniquely identifies the storage command of the submission queue associated with the submission queue fetch error using the SQID and CID.

17 Claims, 10 Drawing Sheets

(56) References Cited

U.S. PATENT DOCUMENTS

| | | |
|---|---|---|
| 8,904,122 B2 | 12/2014 | Kalos et al. |
| 10,296,249 B2 | 5/2019 | Benisty |
| 2006/0277325 A1 | 12/2006 | Jin et al. |
| 2011/0321052 A1 | 12/2011 | Long |
| 2015/0067291 A1 | 3/2015 | Miyamoto et al. |
| 2015/0378605 A1* | 12/2015 | Huang .................. G06F 3/0659 711/103 |
| 2016/0124876 A1 | 5/2016 | Vucinic et al. |
| 2019/0079824 A1* | 3/2019 | Tomlin ................ G06F 11/0706 |
| 2021/0182219 A1* | 6/2021 | Benisty ................ G06F 3/0604 |

OTHER PUBLICATIONS

NVM Express, Inc, "NVM Express Rev 1.3d", Mar. 20, 2019, pp. 8, 9, 13-17, 55, 56, 67-69, available here: https://nvmexpress.org/wp-content/uploads/NVM-Express-1_3d-2019.03.20-Ratified.pdf; © 2007-2019 NVM Express, Inc. All Rights Reserved.

\* cited by examiner

COMMAND MESSAGE 502

| Device ID | SQID | CID | ASQ | | |
|---|---|---|---|---|---|
| | | | Address | OPC | NSID |
| 006:00:0 | 0x0000 | 0x0013 | 00000004:3BE44340 | Get Log Page | 0xFFFFFFFF |

COMPLETION MESSAGE 504

| Device ID | ACQ | | SQHD | CID | SC |
|---|---|---|---|---|---|
| | Address | | | | |
| 006:00:0 | 00000004:3BEB70D0 | | 0x000E | ???? | Successful Completion |

506 — SQHD 0x000E
508 — CID ????

FIG. 5

ERROR RECOVERY FROM SUBMISSION QUEUE FETCHING ERRORS

BACKGROUND

Non-Volatile Memory Express (NVMe) is a standard for accessing non-volatile storage media attached to a host device via a Peripheral Component Interconnect Express (PCIe) bus. NVMe may be used with a variety of non-volatile storage media, such as solid-state drives (SSDs) and hard disk drives (HDDs). One focus of NVMe relates to input/output (I/O) communication between a host device (which may access and/or write to the non-volatile storage media) and a memory device (which includes the non-volatile storage media). In that regard, NVMe implements a paired submission queue and completion queue mechanism, with host software on the host device placing commands into the submission queue. Completions are placed onto the associated completion queue by the storage controller.

"Host" or "host device" refers to any processing device or computer device or computer system configured to send and receive storage commands. Examples of a host include, but are not limited to, a computer, a laptop, a mobile device, an appliance, a virtual machine, an enterprise server, a desktop, a tablet, a main frame, and the like.

"Storage command" refers to any command relating with a storage operation. Examples of storage commands include, but are not limited to, read commands, write commands, administrative commands, maintenance commands, diagnostic commands, test mode commands, and any other command a storage controller may receive from a host or issue to another component, device, or system.

NVMe is based on a paired submission queue (SQ) and completion queue (CQ). The host device, using host software, places commands into a respective submission queue. "Submission queue" refers to a data structure configured to queue storage commands for retrieval and execution by a storage device.

The memory device/storage device, via the storage controller, places entries in the associated completion queue, with the entries indicative of completions for issued commands. In one implementation, Submission Queues and Completion Queues are allocated in the host device memory, such as a host memory buffer. The allocation of memory to the Submission Queues and Completion Queues in the host memory buffer may be physically located contiguously or non-contiguously.

When a PCIe packet error occurs after, or while, fetching a command from a submission queue, the content of the command may be corrupted or invalid and cannot be reliably used. In this case, the device does not get the command reliably (and in case of some errors may not get the command at all), even though the command was fetched (or a fetch was attempted) from the host.

This is problematic because while certain data for a command may have been fetched, because of the nature of the error, the command identifier for the command cannot be reliably used by the device. Further, the device cannot post a completion entry for that command, or report an error completion, since device does not have the command identifier, or does not have a command identifier that can be trusted as accurate and uncorrupted. Such fetch errors may cause blue screen and fatal failures.

There is a need for a mechanism for recovering from submission queue fetching errors where the command identifier is lost or cannot be trusted to be accurate.

SUMMARY

This disclosure relates to an apparatus comprising a non-volatile memory media and a storage controller. The storage controller is configured to fetch a storage command from a submission queue of a host. The submission queue has a submission queue identifier (SQID). The storage controller then determines a submission queue fetch error in response to receiving a Transport Layer Packet (TLP) error as a result of fetching the storage command. Next, the storage controller is configured to determine a command identifier (CID) for the storage command associated with the submission queue fetch error. The storage controller then sends a completion message to the host. The completion message uniquely identifies the storage command of the submission queue associated with the submission queue fetch error using the SQID and CID.

This disclosure further relates to a system comprising a host, a Peripheral Component Interconnect Express (PCIe) bus, a storage device, a non-volatile memory media, and a storage controller. "Storage device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. A storage device is one embodiment of a memory device and both terms are used interchangeably herein. Examples of storage devices include, but are not limited to, a hard disk drive, flash memory, MRAM memory, a Solid-State storage device, Just a Bunch Of Disks (JBOD), Just a Bunch Of Flash (JBOF), an external hard disk, an internal hard disk, and the like.

The storage device is coupled to the host via the PCIe bus. The storage device comprises non-volatile memory media and a storage controller. The storage controller is configured to communicate with the host over the PCIe bus using a Non-Volatile Memory express (NVMe) protocol. The storage controller comprises a PCIe medium access control (MAC) and physical layer (PHY) interface, a command fetcher, a queue manager, and a command identifier tracker. The command fetcher is configured to fetch a storage command from the host. The queue manager is configured to manage a submission queue identifier (SQID) and to determine a submission queue fetch error as a result of fetching the storage command. In some cases, the error detected may be a Transport Layer Packet (TLP) error.

The command identifier tracker is configured to determine a command identifier (CID) for the storage command associated with the submission queue fetch error. The command identifier is based on a command identifier allocation model. The queue manager is further configured to post a completion message to the host. The completion message comprises the SQID and the CID and is configured to uniquely identify the storage command of the submission queue associated with the submission queue fetch error.

Finally, this disclosure relates to a method that first comprises attempting to fetch a storage command from a submission queue of a host. The submission queue has a submission queue identifier (SQID). The method next comprises detecting a submission queue fetch error as a result of attempting to fetch the storage command. Then the method comprises determining a command identifier (CID) for the storage command associated with the submission queue fetch error. Finally, the method comprises posting a completion message to the host. The completion message comprises the SQID and the CID to uniquely identify the storage command of the submission queue associated with the submission queue fetch error.

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 5 illustrates an exemplary command message and completion message 500 in accordance with one embodiment.

DETAILED DESCRIPTION

Figure 1:
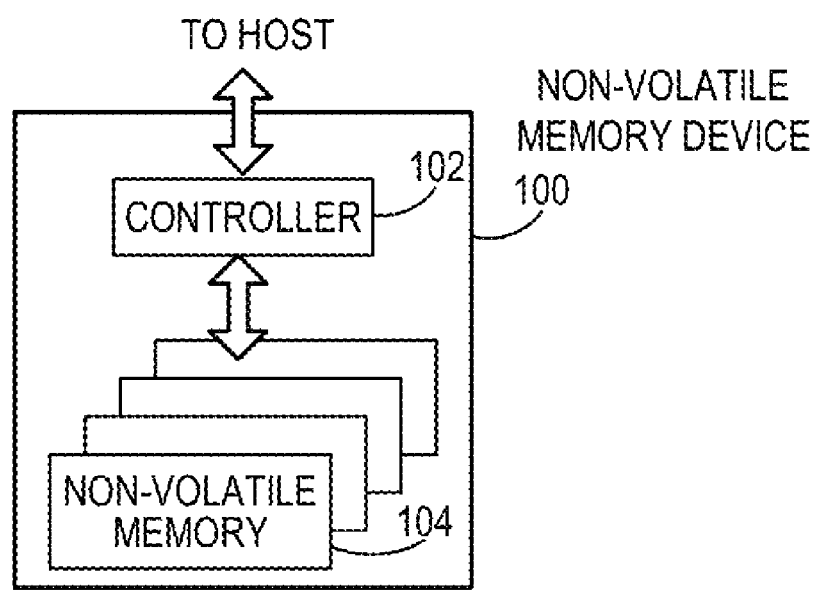
FIG. 1 is a block diagram of an exemplary non-volatile memory device.

This disclosure proposes an apparatus, system, and method for recovery from a submission queue (SQ) fetching error by enabling a proper posting of an error completion entry to the host, even without fetching the command or at least without fetching a version of the storage command for which the data values can be trusted as accurate. This solution may incur very low latency when recovering from such errors, compared to the milliseconds and/or seconds required by conventional approaches. In addition, the solution may avoid breaking the internal pipeline when fetching commands from the host. Instead, the claimed solution presents a stable and robust solution where the storage device may complete a command with an error, even without accurately fetching the corresponding command.

When creating a submission queue, the host may define the attributes of the queue (e.g., base address, size, physical contiguous, etc.). As part of one or more embodiments disclosed herein, the host may also define the usage model of the command identifier (CID). "Command identifier" refers to an identifier configured to uniquely distinguish one storage command in a submission queue from all other storage command in that same submission queue. In certain embodiments, the same command identifier may be used repeatedly for the same submission queue so long as any prior storage commands that use the command identifier have successfully completed or been otherwise resolved.

The command identifier may be any symbol or set of data, including a set of alphanumeric characters. In certain embodiments, the command identifier is a numerical value that is 16 bits in length. The command identifier may be represented as a binary value, a hex value, an ascii value, or the like.

For instance, the host may choose from one of the following models (or any combination):
1. Incremental model—The value of the CID may be incremented by one for each new command queued in the SQ.
2. Decremental model—The value of the CID may be decremented by one for each new command queued in the SQ. The host may also provide the initial value.
3. Incremental model with min/max value—The value of the CID may be incremented by one for each new command queued in the SQ. The host may define maximum and minimum values. When the maximum value is reached, the next value may be the minimum value.
4. Decremental model with min/max value—The value of the CID may be decremented by one for each new command queued in the SQ. The host may define maximum and minimum values. When the minimum value is reached, the next value may be the maximum value.
5. Flexible Incremental/Decremental model—The increment/decrement value may be configurable and/or defined by the host.
6. One Hot with Shift Left or Shift Right—Instead of a static increment/decrement value, the CID may be adjusted with a different increment/decrement each time, following a one hot with shift left or right pattern. For instance, 1, 2, 4, 8, 16, 32, etc.
7. Flexible Multiplier—Instead of a static increment/decrement value, the CID may be adjusted with a different increment/decrement each time using a flexible multiplier. For instance, 1, 3, 9, 27, 81, etc.

Using the designated command identifier allocation model, the storage device may determine the command identifier (CID) of the commands even without fetching them or without accurately fetching them. In case of an SQ fetching error, the storage device may post an error message to the host using the determined CID, even without receiving the CID from the host. This concept may simplify the error recovery flow significantly.

FIG. 1 is a block diagram illustrating a non-volatile memory device 100. The non-volatile memory device 100 may include a storage controller 102 and non-volatile memory that may be made up of one or more non-volatile memory die(s) 104. As used herein, the term die refers to the set of non-volatile memory cells, and associated circuitry for managing the physical operation of those non-volatile memory cells, that are formed on a single semiconductor substrate.

"Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

"Memory cell" refers to a type of storage media configured to represent one or more binary values by way of a determinable physical characteristic of the storage media when the storage media is sensed, read, or detected to determine what binary value(s) was last stored in the memory cell. Memory cell and storage cell are used interchangeably herein.

The storage controller 102 may interface with a host device or a host system and transmit command sequences for read, program, and erase operations to the non-volatile memory die(s) 104. As discussed below, the commands may include logical and/or physical addresses.

The storage controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The storage controller 102 can be configured with hardware and/or firmware to perform the various functions described below and shown in the flow diagrams. Also, some of the components shown as being internal to the controller can also be positioned external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. In one embodiment, a flash memory controller is one embodiment of a storage controller. In one embodiment, a flash memory controller manages flash memory. "Flash memory" refers to a type of non-volatile memory media comprising memory cells comprising two types NOR and NAND each type named after the type of logic gates used in the memory array of memory cells. "Non-volatile memory media" refers to any hardware, device, component, element, or circuit configured to maintain an alterable physical characteristic used to represent one or more binary values of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the storage controller 102 and the non-volatile memory die(s) 104 may be any suitable flash interface, such as Toggle Mode. In one embodiment, the non-volatile memory device 100 may be a card-based system, such as a secure digital (SD™) or a micro secure digital (micro-SD™) card. In an alternate embodiment, the non-volatile memory device 100 may be part of an embedded memory device.

Although in the example illustrated in FIG. 1, the non-volatile memory device 100 may include a single channel between the storage controller 102 and the non-volatile memory die(s) 104, the subject matter described herein is not limited to having a single memory channel. For example, in some NAND memory device architectures, 2, 4, 8 or more NAND channels may exist between the controller and the non-volatile memory die(s) 104, depending on controller capabilities. In any of the embodiments described herein, more than a single channel may exist between the controller and the non-volatile memory die(s) 104, even if a single channel is shown in the drawings.

Figure 2:
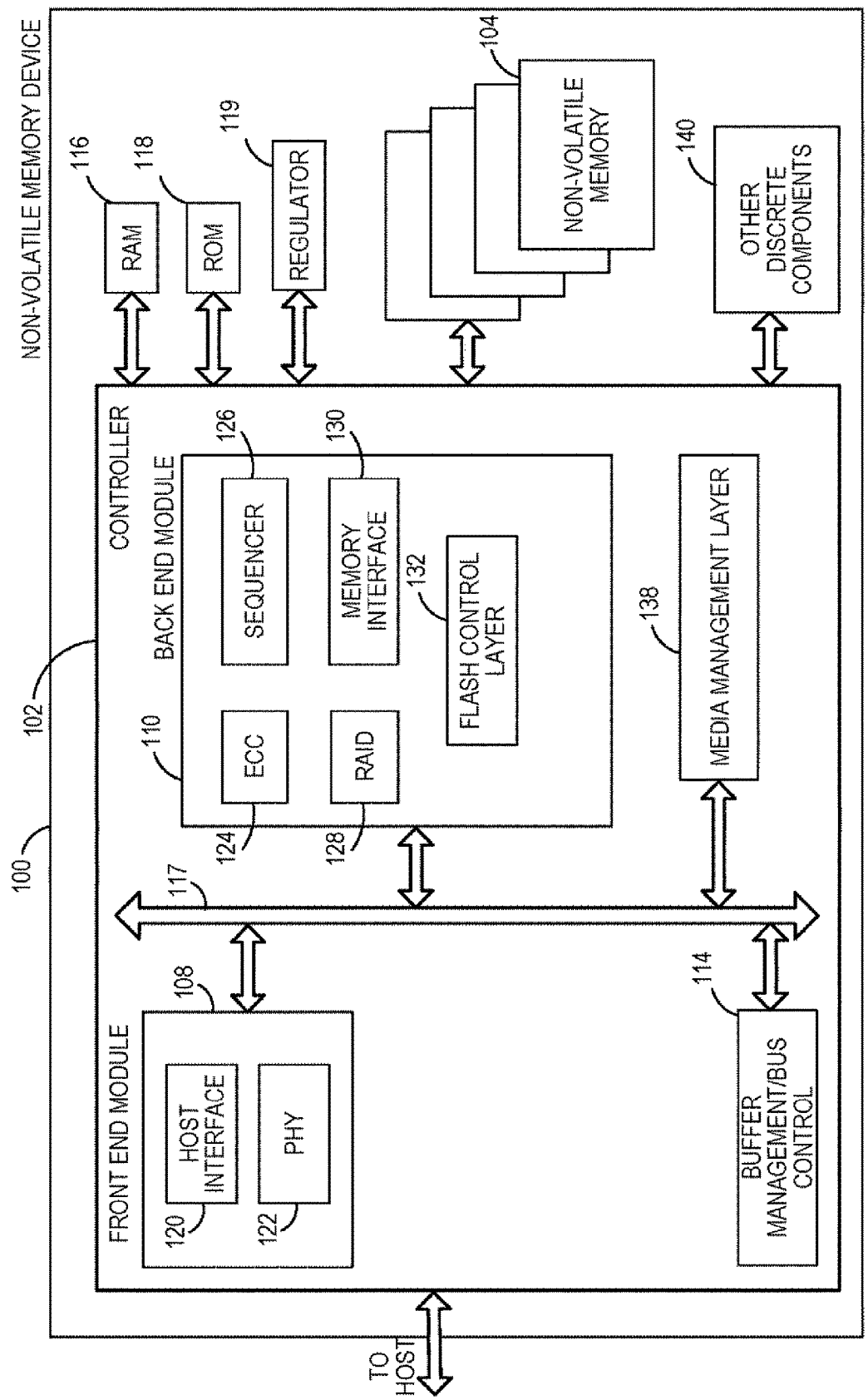
FIG. 2 is a block diagram of exemplary components of a storage controller of the non-volatile memory device of FIG. 1.

FIG. 2 is a block diagram illustrating exemplary components of the storage controller 102 in more detail. The storage controller 102 may include a front-end module 108 that interfaces with a host, a back-end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition, or alternatively, each module may include memory hardware that comprises instructions executable with a processor or processor circuitry to implement one or more of the features of the module. When any one of the modules includes the portion of the memory that comprises instructions executable by the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The storage controller 102 may include a buffer management/bus control module 114 that manages buffers in random-access memory (RAM) 116 and controls the internal bus arbitration for communication on an internal communications bus 117 of the storage controller 102. A read only memory (ROM) 118 may store and/or access system boot code. Although illustrated in FIG. 2 as located separately from the storage controller 102, in other embodiments one or both of the RAM 116 and the ROM 118 may be located within the storage controller 102. In yet other embodiments, portions of RAM 116 and ROM 118 may be located both within the storage controller 102 and outside the storage controller 102. Further, in some implementations, the storage controller 102, the RAM 116, and the ROM 118 may be located on separate semiconductor dies. As discussed below, in one implementation, the submission queues and the completion queues may be stored in the Controller Memory Buffer, which may be housed in RAM 116. Further, RAM 116 may include different types of cache, such as always-on memory and DRAM.

Additionally, the front-end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, Serial ATA (SATA), SATA Express, Serial Attached SCSI (SAS), Fibre Channel, USB, PCIe, and NVMe. The host interface 120 may typically facilitate transfer for data, control signals, and timing signals.

The back-end module 110 may include an error correction code (ECC) engine 124 that encodes the data bytes received from the host, and decodes and error corrects the data bytes read from the non-volatile memory die(s) 104. As discussed in more detail below, the ECC engine 124 may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back-end module 110 may also include a command sequencer 126 that generates command sequences, such as program, read, and erase command sequences, to be transmitted to the non-volatile memory die(s) 104. Additionally, the back-end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode interface. A flash control layer 132 may control the overall operation of back-end module 110.

Thus, the storage controller 102 may include one or more management tables for managing operations of memory device 100. One type of management table includes a logical-to-physical address mapping table. The size of the logical-to-physical address mapping table may grow with memory size. In this regard, the logical-to-physical address mapping table for high capacity storage device (e.g., greater than 32 gigabytes (GB) may be too large to store in static random-access memory (SRAM), and may be stored in non-volatile memory die(s) 104 along with user and host data. Therefore, accesses to non-volatile memory die(s) 104 may first require reading the logical-to-physical address mapping table from non-volatile memory die(s) 104.

Additional modules of the non-volatile memory device 100 illustrated in FIG. 2 may include a media management layer 138, which performs wear leveling of memory cells of the non-volatile memory die(s) 104. The non-volatile memory device 100 may also include other discrete components 140, such as external electrical interfaces, external RAM, resistors, capacitors, or other components that may interface with storage controller 102. In alternative embodiments, one or more of the RAID modules 128, media management layer 138 and buffer management/bus control module 114 are optional components that may not be necessary in the storage controller 102.

Figure 3:
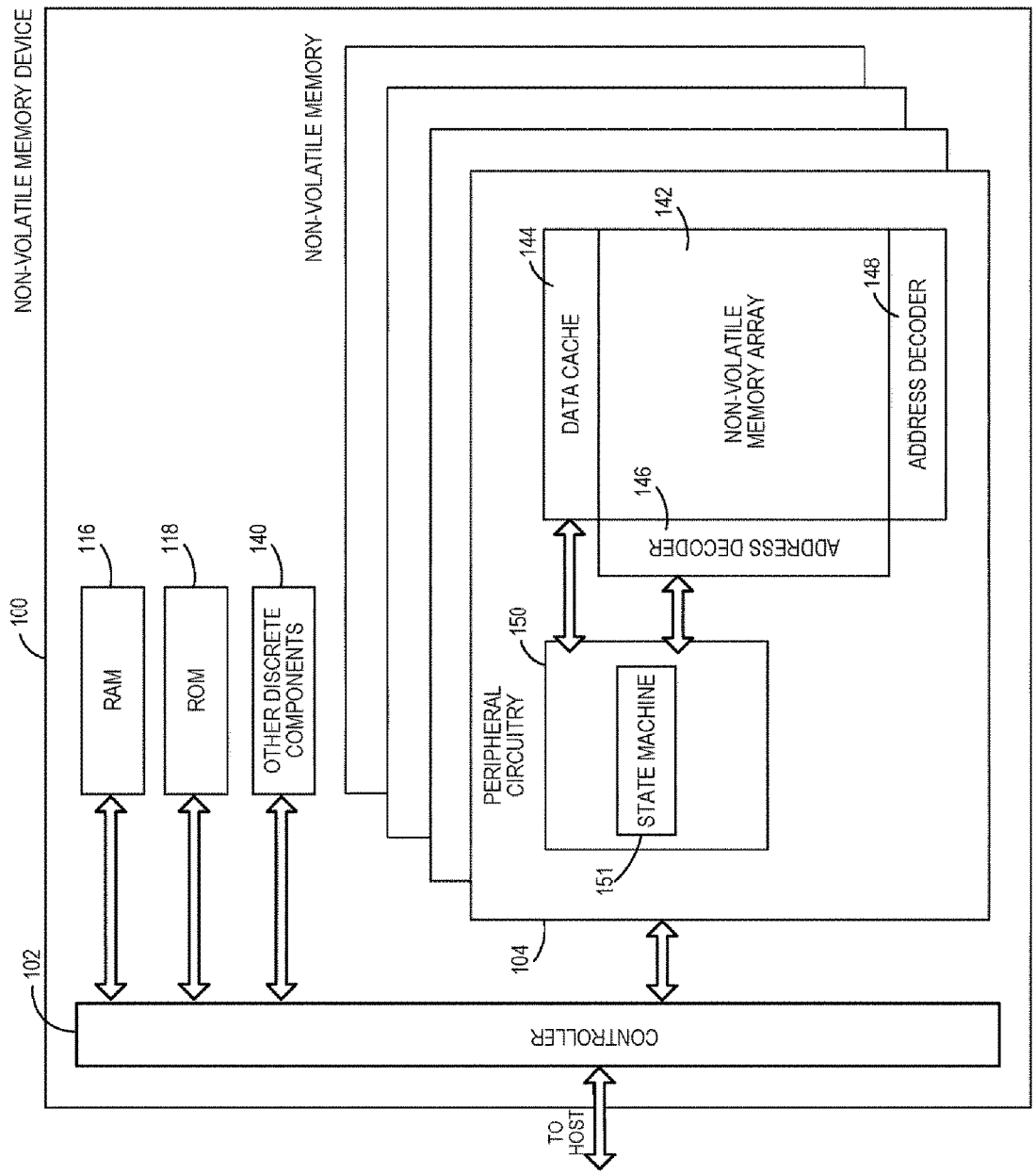
FIG. 3 is a block diagram of exemplary components of a non-volatile memory die of the non-volatile memory device of FIG. 1.

FIG. 3 is a block diagram illustrating exemplary components of a non-volatile memory die(s) 104 in more detail. The non-volatile memory die(s) 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three-dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge on the floating gate. The presence or absence of charges on the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity. In other embodiments, a flash memory cell may comprise a charge trap technology rather than floating gate technology.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include word lines and bit lines connected to the FGTs. Each page of FGTs is coupled to a word line. In particular, each word line may be coupled to the control gates of FGTs in a page. In addition, each string of FGTs may be coupled to a bit line. Further, a single string may span across multiple word lines, and the number of FGTs in a string may be equal to the number of pages in a block.

The non-volatile memory die(s) 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular word line in the memory array 142 when reading or writing data to/from the memory cells in the memory array 142. The column address decoder 148 may decode a column address to select a particular group of bit lines in the memory array 142 to be electrically coupled to the data cache 144.

In addition, the non-volatile memory die(s) 104 may include peripheral circuitry 150. The peripheral circuitry 150 may include a state machine 151 that provides status information to the storage controller 102. Other functionality of the state machine 151 is described in further detail below.

Figure 4:
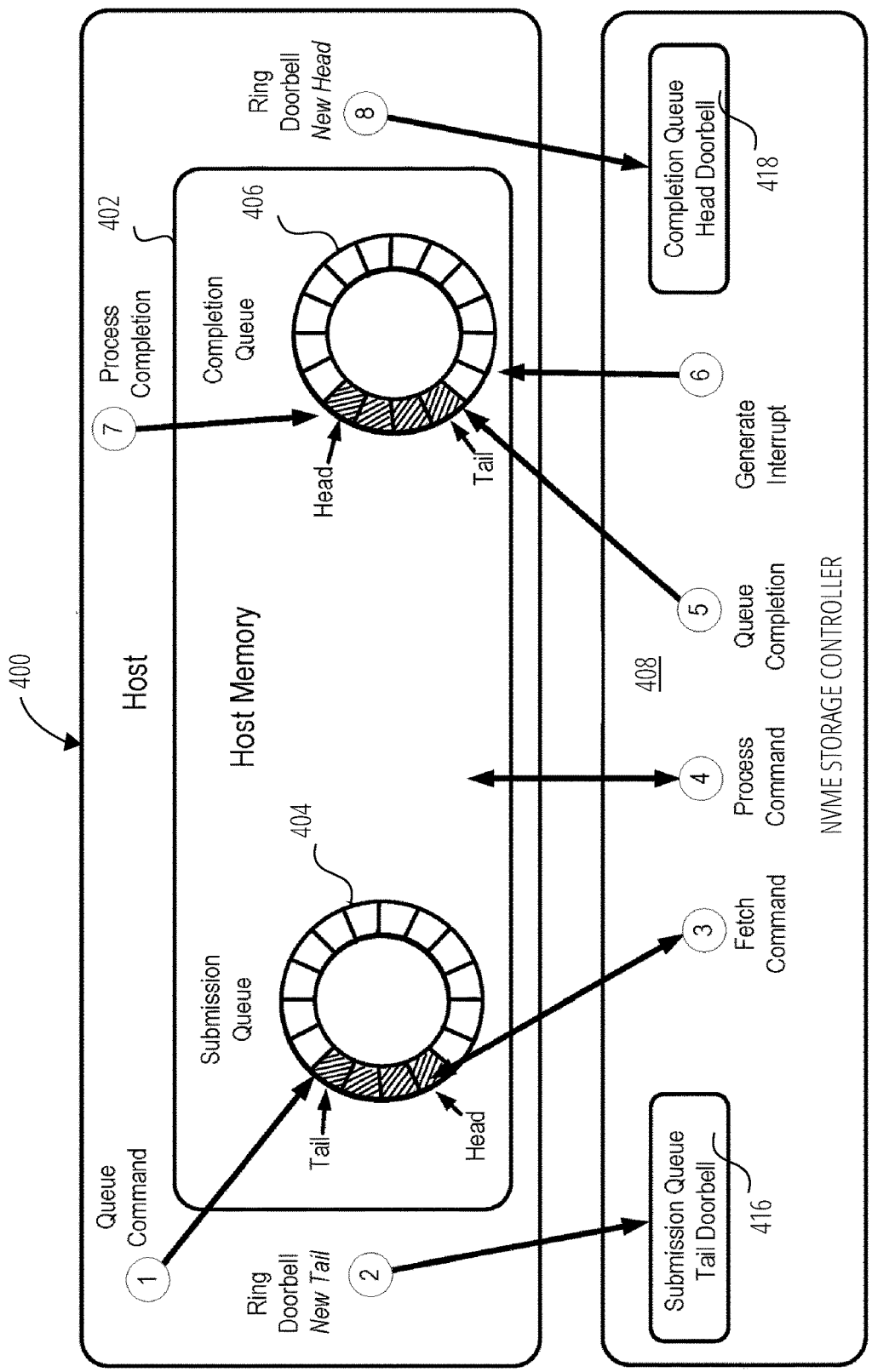
FIG. 4 illustrates an item 400 in accordance with one embodiment.

FIG. 4 shows a host device 400 and an NVMe storage controller 408 and illustrates a sequence of steps for executing a command via the NVMe standard. As shown, the host device 400 includes host memory 402, and the memory device includes a controller, such as an NVMe storage controller 408. In one implementation, the host memory 402 includes a submission queue 404 and a completion queue 406. In practice, at the initialization phase, the host device 400 creates one or more submission queues and one or more corresponding completion queues. As discussed above, in one implementation, the submission queues and completion queues may have a 1:1 correlation, and in another implementation, the submission queues and completion queues do not have a 1:1 correlation.

For initialization, the host device 400 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. Alternatively, the host device 400 may instruct the memory device to create the submission queue(s) and corresponding completion queue(s) in a memory resident in the memory device, such as a controller memory buffer.

The submission queue 404 may be based on a ring buffer, such as shown in FIG. 4, with a head pointer and a tail pointer. After creating the submission queue(s) and notifying the memory device about the created submission queue(s), the host device 400 may write a command (or several commands) to the submission queue. This is indicated in FIG. 4 as step 1, labeled "Queue Command". In particular, FIG. 4 illustrates that four commands were written to the submission queue. In one implementation, the memory device is unaware that the host device 400 has updated the submission queue 404 with four commands, since the host device 400 updated its own host memory 402. In another implementation (such as when the submission queue(s) and completion queue(s) are resident in the controller memory buffer), the memory device may monitor a communication interface between the host device 400 and the memory device for particular communications, such as writing to the submission queue(s) resident on the memory device. For example, the memory device can monitor the transport layer packets (TLPs) on the PCI Express bus to determine whether the host device 400 has sent a TLP that results in an update to the submission queue resident in the controller memory buffer. In that regard, the memory device may identify one or more entries being written to the submission queue(s).

In step 2, the host device 400 writes to a submission queue tail doorbell register 416 in the memory device. This writing to the submission queue tail doorbell register 416 signifies to the memory device that the host device queued one or more commands in this specific submission queue 404 (e.g., 4 commands as illustrated in FIG. 4). The writing to the submission queue tail doorbell register 416 may take one of several forms. In one way, the host device 400 indicates a new tail for the submission queue 404, thereby indicating the number of commands written to the submission queue 404. Thus, since the memory device is aware of the base address for the submission queue 404, the memory device only needs to know the tail address to indicate the number of new commands written to the submission queue 404. After a command (or a set of commands) is processed, the memory device then sets the new head of the submission queue 404 accordingly, so that the tail pointer may represent an "offset" from the head pointer. In another way, the host device 400 indicates a number of commands written to the submission queue 404. In practice, each submission queue 404 has a corresponding submission queue tail doorbell register in the memory device, so that when the host device 400 updates a particular doorbell register (correlated to a particular submission queue 404), the memory device can determine, based on the doorbell register, which particular submission queue 404 has been updated.

After step 2 (whereby the memory device is notified of command(s) in the submission queue 404) and before step 3 (whereby the memory device fetches the command(s)), the memory device is aware that there are command(s) pending in the submission queue 404. In the general case, there may be several submission queues (with potentially many pending commands in the several submission queues). Thus, before performing step 3, the storage controller may arbitrate between the various submission queues to select the particular submission queue from which to fetch the command(s).

Responsive to determining which particular submission queue 404 from which to fetch the command(s), at step 3, the memory device fetches the command(s) from the particular submission queue 404. In practice, the memory device may access the base address of the particular submission queue 404 plus the pointer on the current head pointer implemented in the host device 400.

When a communication error, such as a transmission error or PCIe packet error, occurs when fetching a command from a submission queue, the content of the command may be invalid and/or corrupted and thus is unreliable and cannot be used. In certain instances, the memory device does not get the command or data for some or all fields of the command, even though the storage command was fetched from the host (or a fetch attempt was made). In particular, the command identifier information for the storage command may not have been fetched, or if fetched may not be reliably trusted due to the nature of the communication error.

For such submission queue fetch errors, a conventional memory device may be unable to post a completion entry for the command. "Submission queue fetch error" refers to an error that occurs when a storage device attempts to fetch a storage command for a queue. In one embodiment, the queue is a submission queue maintained in memory of a host. In another embodiment, the queue is a submission queue maintained in memory of a storage device. The memory device may further be unable to report an error completion, since the memory device does not have a command identifier, or does not have a reliable command identifier. Such errors may cause blue screen and fatal failures. Existing solutions, such as forcing a controller reset, relying on the host to detect the failed command, or device retries to fetch the same command, can incur extreme latency, from tens of milliseconds to several seconds. Further, such solutions may be quite complex, relying on host timeout or additional hardware and firmware logic. These drawbacks necessitate the disclosed solution.

As discussed above, the submission queue or completion queue may be assigned an area of memory (such as in the host device or in the controller memory buffer in the memory device). The submission queue and completion queues may include multiple entries, each associated with a specific command. The size of each entry may be a predetermined size, such as 64 kilobytes (Kb). In this regard, entries within the submission queue may be determined using the base address for the submission queue, and by offsetting the base address with the number of entries multiplied by the size of each entry (e.g., 64 Kb).

As discussed above, the memory device is aware of the tail pointer, having been notified via step 2. Thus, the memory device can obtain all of the new commands from the submission queue 404. In a submission queue resident in the host device, the memory device may send a TLP request to obtain the command(s) from the submission queue 404. Responsive to receipt of the TLP request, the host device 400 sends a completion TLP message with the commands in the submission queue 404. In this regard, at end of step 3, the memory device receives the command(s) from the submission queue 404.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device causes the data to be stored on the host device based on information in the command. As another example, the command may comprise a write command. Responsive to receipt of the write command, the memory device parses the write command, determines the location of the data on the host device subject to the write, reads the data from the location on the host device, and writes the data to flash memory.

In practice, the memory device may retrieve data out of sequence. This may be due to the data subject to retrieval being on several flash dies, with the dies being available for data retrieval at different times. In NVMe, there may be a multitude of PCIe TLPs to transfer the data from the memory device to the host device 400. Typically, the transferred data is stored in the host memory 402 of the host device 400 based on an indication in the command (e.g., the command may include an address at which to store the requested data). The more TLPs there are, the higher the risk of incurring a submission queue fetch error may be, especially an uncorrectable submission queue fetch error.

After completing the data transfer, at step 5, the storage controller sends a completion message to the relevant completion queue 406. "Completion message" refers to a message, signal or indication from a storage device to a host that communicates that a storage command initiated by the host has completed. In certain embodiments, a completion message may be issued, generated, provided, when a storage command completes successfully. In other embodiments, a completion message may be issued, generated, provided, when a storage command experiences an error. The completion message may indicate the type of error, the severity of error, and/or whether any aspects of the storage command were completed. In one embodiment, the completion message includes a completion identifier.

As mentioned above, at the initialization phase, the host device 400 associates submission queues with completion queues, so that the host device 400 is aware of commands that are completed in the submission queue based on which completion queue the memory device writes to. The completion message may contain information as to the processing of the command(s), such as whether the command was completed successfully or whether there was an error when executing the command.

After step 5, the host device 400 is unaware that the memory device posted to the completion queue 406. This is due to the memory device causing data to be written to the completion queue 406. In that regard, at step 6, the memory device notifies the host device 400 that there has been an update to the completion queue 406. In particular, the memory device posts an interrupt to the host device 400 (e.g., in NVMe, the host device 400 may use a message-signaled interrupt (MSI)).

Responsive to receiving the interrupt, the host device 400 determines that there are one or more completion entries pending for the host device 400 in this completion queue 406. At step 7, the host device 400 then processes the entries in the completion queue 406.

After the host processes the entries from the completion queue 406, at step 8, the host device 400 notifies the memory device of the entries that the host device 400 processed from the completion queue 406. This may be performed by updating a completion queue head doorbell register 418 indicative to the memory device that the host device 400 processed one or more entries from the completion queue 406. Responsive to updating the completion queue head doorbell register 418, the memory device updates the head of the completion queue 406. Given the new head, the memory device is aware as to which entries in the completion queue 406 have already been processed by the host device 400 and may be overwritten.

FIG. 5 illustrates an exemplary command message and completion message 500 in accordance with one embodiment. An example NVMe command message 502 is illustrated, such as may be captured in a communication trace. As shown, the command message 502 may include the CID field, which in this example is 0x0013. The submission queue identifier (SQID) is in the SQID field. "Submission queue identifier" refers to an identifier configured to uniquely distinguish one submission queue from all other submission queues that may be in use.

The submission queue identifier may be any symbol or set of data, including a set of alphanumeric characters. In certain embodiments, the submission queue identifier is a numerical value that is 16 bits in length (a 16-bit identifier). The submission queue identifier may be represented as a binary value, a hex value, an ascii value, or the like. In this example, the submission queue ID is 0x0000, indicating the administrator queue. Of course, this solution may be used with any submission completion queue pair. "Submission completion queue pair" refers to a submission queue and a corresponding completion queue, each configured such that commands submitted on the submission queue will have a corresponding completion message on the completion queue.

An example NVMe completion message 504 is also illustrated, associated with the command message 502. A typical completion message 504 may include a submission queue identifier 506 and a command identifier 508 for the relevant command.

Per the NVMe standard, a combination of the submission queue identifier 506 and command identifier 508 serves as a unique identifier allowing the host to associate the completion message 504 with a previously queued command message 502. Only after processing the completion message 504 may the host reuse a CID value for a given submission queue.

In the case of a submission queue fetch error, the data in the command identifier 508 may be unknown, as indicated by the question marks in this figure. (e.g., "????") Or, in certain cases, the command identifier 508 may have a data value, however due to the nature of an error, including a submission queue fetch error, the data in the field for the command identifier 508 may be unreliable and cannot be used. The NVMe protocol uses the PCIe specification standard as the physical, link and transport layers. The PCIe standard defines several fatal, non-fatal, uncorrectable, and correctable errors that may happen on the link.

Uncorrectable errors are those error conditions that impact functionality of the interface. There is no mechanism defined in PCIe specification to correct for uncorrectable errors, including submission queue fetch errors. The claimed solution resolves certain error conditions, such as submission queue fetch errors with minimal latency impact on the system, even in a case of an unknown command identifier 508.

Figure 6:
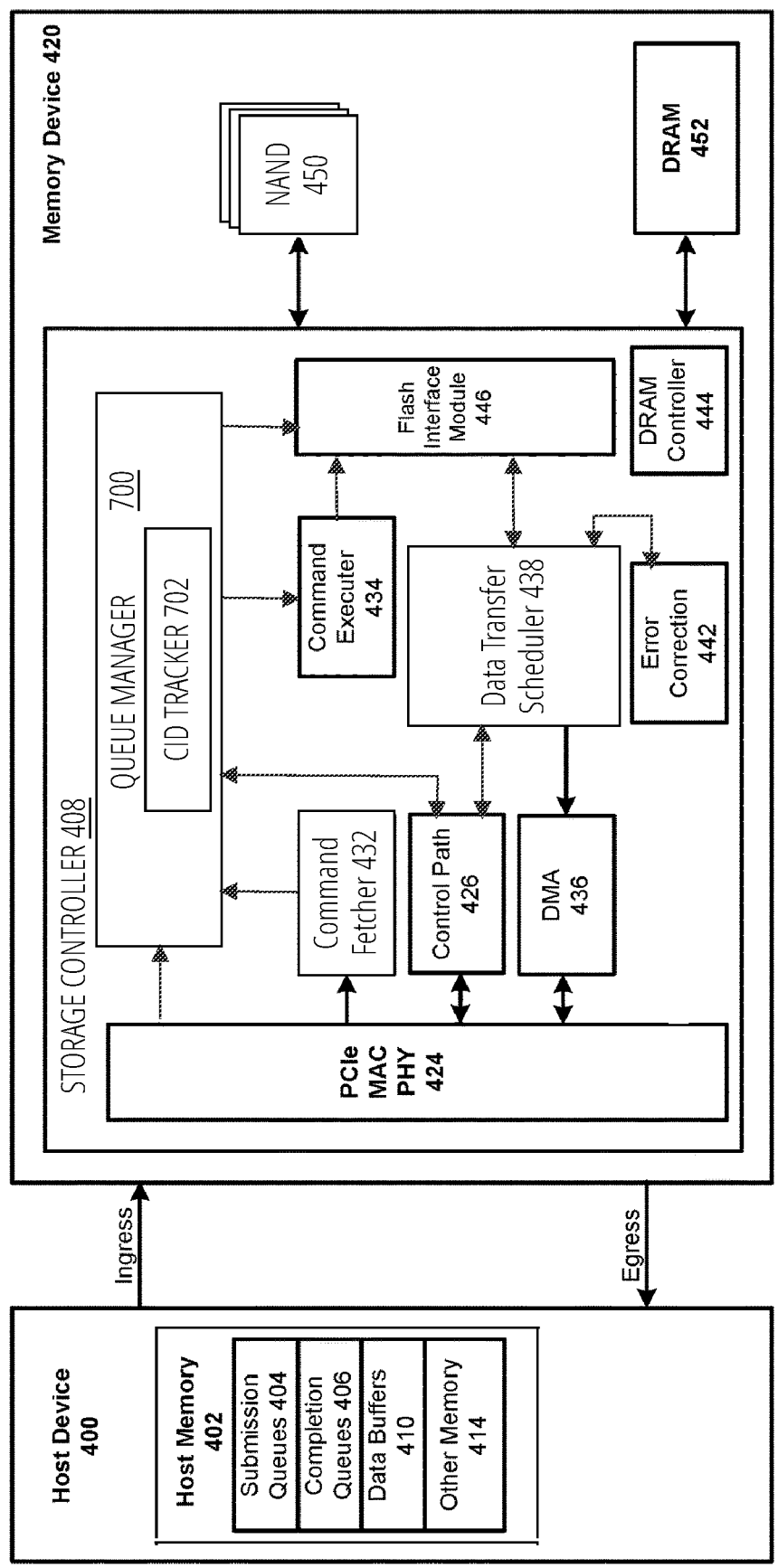
FIG. 6 is a block diagram of other exemplary components of a host device and a storage device.

FIG. 6 is a block diagram of exemplary components of the host device 400 and a memory device 420. The host device 400 includes host memory 402, which may comprise one or more submission queues 404, one or more completion queues 406, data buffers 410, and other memory 414. The memory device 420 includes the storage controller 408 and NAND memory arrays 450, which in a preferred embodiment comprise flash memory. The storage controller 408 may incorporate some, or all, of a PCIe medium access control (MAC) and physical layer (PHY) interface 424. "PCIe medium access control (MAC) and physical layer (PHY) interface" refers to hardware, firmware, software, circuitry, component, module, logic, device, or apparatus configured, programmed, designed, arranged, or engineered to support, interface with, and conduct communications between a physical layer, a media access layer, and/or a transport layer of the Open Systems Interconnection (OSI) model.

Direct Memory Access (DMA) 436 is configured to perform the data transfer between host device 400 and memory device 420. Queue manager 700 is configured to post completion entries to the completion queues 406, while also handling the relevant pointers. Error correction 442 is configured to correct data that is fetched from the NAND memory arrays 450. Flash interface module 446 is configured to control and access the NAND memory arrays 450.

NVMe may include a scalable host controller interface designed to address the needs of Enterprise and Client systems that utilize PCI Express based solid-state drives. In this regard, the interface may provide optimized command submission and completion paths. NVMe may include support for parallel operation by supporting up to 65,535 I/O Queues with up to 64K outstanding commands per I/O Queue.

FIG. 6 further illustrates a communication interface between the host device 400 and the memory device 420. In a first implementation (not illustrated in FIG. 6), the communication interface between the host device and the memory device is simplex, with communications to, and communications from, the memory device on the same path. In a second implementation (illustrated in FIG. 6), the communication interface between the host device 400 and the memory device 420 is duplex, with a separate ingress path and a separate egress path. The ingress path, from the perspective of the memory device 420, includes incoming requests from the host device 400 to the memory device 420. Conversely, the egress path, from the perspective of the memory device 420, includes outgoing requests from the memory device 420 to the host device 400.

The incoming requests (requests from the host device 400 to the memory device 420) may be segmented in different ways, such as incoming read requests and incoming write requests. For example, the host device 400 may send, via the ingress path, a read request to read a section of memory in the memory device 420 or a write request to write to a section of memory in the memory device 420. Likewise, the memory device 420 may send, via the egress path, a read request to a section of memory in the host device 400 or a write request to write to a section of memory in the host device 400.

In practice using NVMe, there may be a series of read requests (a request by the host device to read data resident on the memory device, and vice-versa) and a series of write requests (a request by the host device to write data to a location resident on the memory device, and vice-versa). In particular, in NVMe, the memory device and the host device communicate with one another using transaction layer packet (TLP) requests, such as TLP read requests to perform a read on the other device, or TLP write requests to perform a write on the other device.

In one example (with the SQ and the CQ resident on the host device), responsive to a TLP write request (sent via the ingress path) by the host device to the doorbell register on the memory device (with the write to the doorbell register indicating that there is a command on the SQ), the memory device uses a TLP read request (sent via the egress path) to fetch the write command from the SQ (which is resident on the host device). Thus, the write command is a request for the memory device to write data to the non-volatile memory. The memory device then parses the write command for information, such as a SQID and a CID. Thereafter, the memory device performs the write by storing the data in non-volatile memory media (e.g., flash memory) on the memory device. After storing the data, the memory device uses a TLP write request to write an entry to the CQ (indicating that the write command has been completed). When a command is fetched successfully, the memory device uses a TLP write request to generate an interrupt to the host device, with the interrupt signaling to the host device that there is an entry on the CQ. Responsive to the interrupt, the host device reads the entry on the CQ, and then issues a TLP write request to CQ Doorbell Write register indicating that the host device has reviewed the entry on the CQ.

As another example (again with the SQ and the CQ resident on the host device), responsive to a TLP write request by the host to the doorbell register on the memory device (with the write to the doorbell register indicating that there is a command on the SQ), the memory device uses a TLP read request to fetch the read command from the SQ (which is resident on the host device). Thus, the read command is a request for the memory device to read data from the non-volatile memory media and to send the read data to the host device. The memory device then reads the non-volatile memory media (e.g., flash memory) to read the data. The memory device can perform a series of operations on the data, such as error correction, encryption/decryption, etc., with buffering between each of the serial operations. The memory device may then parse the read command for information, such as the SQID and CID. Thereafter, the memory device uses a TLP write request to write the data that was read from non-volatile memory. After writing the data to the host device, the memory device uses a TLP write request to write an entry to the CQ (indicating that the read command has been completed). For commands fetched and completed successfully, the memory device uses a TLP write request to generate an interrupt to the host device, with the interrupt signaling to the host device that there is an entry on the CQ. Responsive to the interrupt, the host device reads the entry on the CQ, and then issues a TLP write request to a CQ Doorbell Write register indicating that the host device has reviewed the entry on the CQ.

Optionally, the CQ and SQ may be resident in the memory device, such as in the Controller Memory Buffer (CMB). In that instance, the host device may send a TLP write request (sent via the ingress path) to the memory device to write to the SQ. Likewise, the memory device may send a TLP write request (sent via the egress path) to generate an interrupt to the host device.

Memory commands may enter various phases, some of which may be performed by memory device 420. Blocks shown in FIG. 6 are directed to various functions associated with the different phases of command processing. Storage controller 408 may include control path 426, which may handle various aspects of the submission queues 404, such as command fetching from the submission queues 404, as discussed in more detail below.

Fetch Errors

In some cases, a storage command may not be fetched successfully. During a storage command fetch operation, the data for the fetch operation may not be successfully received by the storage controller 408. This may result in an uncorrectable packet error or submission queue fetch error. The storage controller 408 may receive a SQID when the host initiates a set of storage operations with the memory device 420 (e.g., mounts or first connects to memory device 420). However, due to the uncorrectable packet error or submission queue fetch error, the storage controller 408 may not have a CID or if a CID was received, the CID may not be trusted as accurate because of the error.

Figure 7:
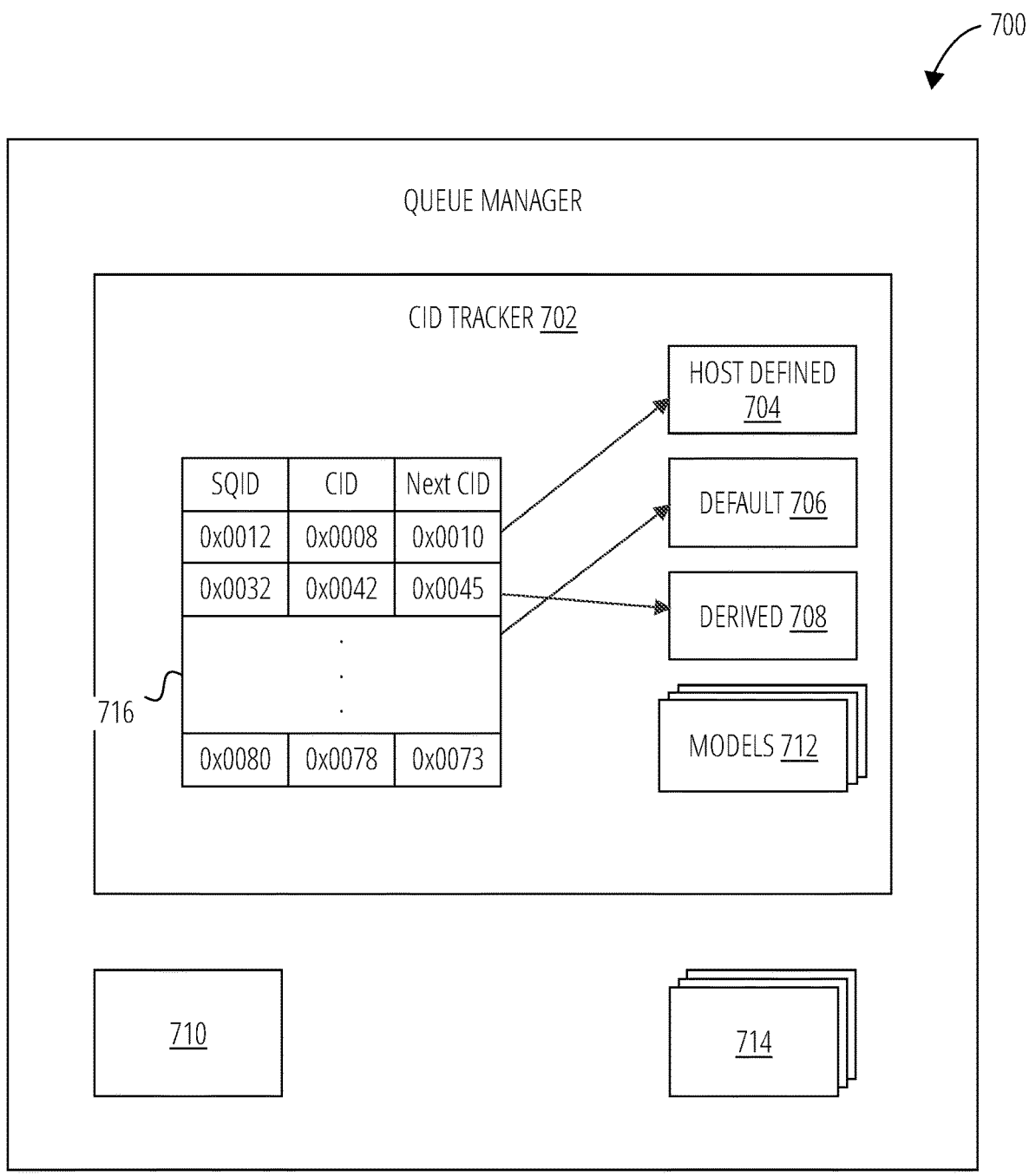
FIG. 7 illustrates a queue manager 700 in accordance with one embodiment.

In certain embodiments, a command fetcher 432, of the storage controller 408, may fetch and queue part, or all, of the NVMe storage commands from the host device 400 submission queues 404 for further processing. Under the NVMe standard, each submission queue 404 is associated with a unique submission queue identifier (SQID). If the storage command is fetched successfully with no errors, the command fetcher 432 may then send the queued commands to a queue manager 700 (FIGS. 6 and 7). If an error is encountered by the command fetcher 432, the command fetcher 432 may retry to fetch the same storage command up to a threshold number of retry attempts. If the retry succeeds the command fetcher 432 sends the queued commands to the queue manager 700. If the retry threshold is met or an uncorrectable error, such as an uncorrectable packet error, occurs, the command fetcher 432 may then notify the queue manager 700 of the error. In one embodiment, the queue manager 700 may retry to fetch the storage command, if there is a submission queue fetch error, either separately or by way of the command fetcher 432.

While the command fetcher 432 is performing a fetch operation, if there is a Transport Layer Packet (TLP) error during, or as a result of, fetching the storage command, the command fetcher 432 may cooperate with, or notify the queue manager 700 of the submission queue fetch error. In one embodiment, the Transport Layer Packet (TLP) error is an uncorrectable packet error.

"Transport Layer Packet (TLP) error" refers to an error condition in a communication protocol transport layer. A Transport Layer Packet (TLP) error may include a corruption of one or more data fields in a packet transferred between a sender and a receiver. The Transport Layer Packet (TLP) error may comprise a correctable error or an uncorrectable error, including an uncorrectable packet error. "Uncorrectable packet error" refers to a communication error registered by one or more of a transport, a link, or a physical layer of a communication protocol stack such as PCIe in which the communication error is so severe that the data of the packet cannot be recovered and cannot be reliably used by the receiver.

The queue manager 700 may be responsible for managing host submission queues. Specifically, the queue manager 700 may manage a submission queue identifier (SQID). In one embodiment, not illustrated, a queue manager may comprise a submission queue manager and a completion queue manager. In one embodiment, the queue manager 700 may determine when a submission queue fetch error occurs. In another embodiment, the command fetcher 432 may determine when a submission queue fetch error occurs and notify the queue manager 700 and the queue manager 700 may then manage the submission queue fetch error and determine how to respond.

In certain embodiments, the queue manager 700 may cooperate with a command identifier tracker 702 to determine a command identifier to be used with a storage command involved in a particular submission queue fetch error. Advantageously, in certain embodiments, the CID command identifier tracker 702 be configured to determine the CID for a storage command even before an attempt is made to fetch the storage command. For example, in one embodiment, the command identifier tracker 702 is configured to determine the CID independent of the host or independent of receiving a CID from the host.

Thus, the storage controller 408 may determine a CID for the storage command associated with the submission queue fetch error. Because the storage controller 408 has a CID, even for storage commands in which there is a submission queue fetch error, the storage controller 408 is able to signal completion of the storage command. In instances where an error occurs, the storage controller 408 may send a completion message, an error message, to the host using the same communication protocol for successfully completed commands. The completion message uniquely identifies the storage command of the submission queue associated with the submission queue fetch error because the completion message includes the SQID and the CID. In certain embodiments, the CID is provided by the command identifier tracker 702.

In some embodiments, the storage controller 408 may determine the command identifier based on a command identifier allocation model. "Command identifier allocation model" refers to a model configured to identify a starting value for a command identifier and a system, method, process, algorithm, or set of instructions for determine what the next command identifier should be that is consistent with the model. A next command identifier is the identifier that is to be used to keep a sequence of command identifier consistent with the model.

In certain embodiments, the model may identify the number of digits for the command identifier and may, in certain embodiments identify a maximum value for the command identifier and/or a minimum value to the command identifier. The maximum value and/or minimum value may be defined such that the model cycles over to the minimum value after using the maximum value or cycles over to the maximum value after using the minimum value.

In certain embodiments, if the model does not designate how much to increment or decrement a last command identifier to determine the next command identifier, a default increment value may be one. In other embodiments, the model may designate a value to be used to determine/identify the next command identifier after the last command identifier or supply an algorithm or function that defines how to determine the next command identifier.

The host may provide the command identifier allocation model to the storage controller 408 before the storage controller 408 begins fetching storage commands. For example, the host may include the command identifier allocation model in one or more commands to the storage controller 408 that define the submission queue/completion queue pair. By following the command identifier allocation model and tracking the number of storage commands services, the storage controller 408 may identify the CID, even when a storage command is not successfully fetched.

In some embodiments, the storage controller 408 may be configured to derive the command identifier allocation model. Those of skill in the art recognize that the storage controller 408 may determine, predict, project, anticipate, forecast, or derive the command identifier allocation model using a variety of techniques or methods. In one embodiment, the storage controller 408 determines the command identifier allocation model based on a storage command history. "Storage command history" refers to any data structure, object, record, or account of information about a plurality of storage commands that have been received in the past by a storage controller.

In some embodiments, a storage controller 408, or other storage device component may forecast the command identifier allocation model based on an industry convention. In some embodiments, a storage controller 408, or other storage device component may predict the command identifier allocation model based on an industry convention. "Industry convention" refers to a fact or method, process, or way of doing things that is well known to most if not all working in or associated with a particular field or industry. For example, suppose there is an industry convention in certain fields or industries, such as computer science or storage, to start identifiers, indexes, counters, and other numbering parameters at a known starting value such as 0 or 1, and that the industry convention is that if the identifier or index or counter is incremented (or changed for a new entry having the index), the identifier or index or counter will be incremented by one. This functionality is described in further detail with regard to FIG. 7.

Command executer 434 is configured to select the next pending command for further execution from the queue manager 700. There may be several queues from which to select. Data transfer scheduler 438 is configured to schedule one or more types of data transfers. As one example, read data may arrive from different memory arrays in parallel. Data transfer scheduler 438 may arbitrate from amongst the different data transfers.

FIG. 6 illustrates one embodiment of a system comprising a host, a Peripheral Component Interconnect Express (PCIe) bus, a storage device, such as memory device 420, a non-volatile memory media, such as NAND memory arrays 450, and a storage controller 408. "Peripheral Component Interconnect Express (PCIe) bus" refers to a communication bus used to pass commands and/or data between two electronic components, chips, systems, or subsystems. The storage device 420 is coupled to the host device 400 via the PCIe bus.

The storage controller 408 is configured to communicate with the host device 400 over the PCIe bus using a Non-Volatile Memory express (NVMe) protocol. The storage controller 408 comprises a PCIe medium access control (MAC) and physical layer (PHY) interface 424, the queue manager 700, and the command identifier tracker 702. In one embodiment, the queue manager 700 determines a submission queue fetch error in response to receiving a Transport Layer Packet (TLP) error as a result of fetching the storage command.

The command identifier tracker 702 is configured to determine a command identifier (CID) for the storage command associated with the submission queue fetch error. The command identifier may be based on a command identifier allocation model. The queue manager 700 may be further configured to post a completion message to the host device 400.

The completion message comprises the SQID and the CID which together, in accordance with the NVMe standard, uniquely identify the storage command of the submission queue 404 associated with the submission queue fetch error. By sending the completion message, the memory device 420 enables the host to more quickly identify that an error occurred and take corrective action. The host device 400 may define the command identifier allocation model when the host device 400 sets up a submission queue 404 and a completion queue 406 with the storage device 420.

FIG. 7 illustrates the queue manager 700 in accordance with one embodiment. The queue manager 700 comprises the command identifier tracker 702, a host defined command identifier allocation model 704, a default command identifier allocation model 706, a derived command identifier allocation model 708, an error tracker 710, a set of command identifier allocation models 712, and a storage command history 714.

In certain embodiments, the command identifier tracker 702 comprises logic configured to manage which command identifier allocation model to use with each of one or more submission queues. For example, the command identifier tracker 702 may include a set of command identifier allocation models 712 that may be predefined and configured to cover the most likely models the command identifier tracker 702 may encounter. Each model in the set of command identifier allocation models 712 includes the instructions, data, parameters and information needed for the command identifier tracker 702 to determine a next CID, given at least the CID of the last storage command that the storage controller has successfully serviced.

Examples of models that are in the set of command identifier allocation models 712 in one embodiment, include:

1. Incremental model—The value of the CID may be incremented by one for each new command queued in the SQ.
2. Decremental model—The value of the CID may be decremented by one for each new command queued in the SQ. The host may also provide the initial value.
3. Incremental model with min/max value—The value of the CID may be incremented by one for each new command queued in the SQ. The host may define maximum and minimum values. When the maximum value is reached, the next value may be the minimum value.
4. Decremental model with min/max value—The value of the CID may be decremented by one for each new command queued in the SQ. The host may define maximum and minimum values. When the minimum value is reached, the next value may be the maximum value.
5. Flexible Incremental/Decremental model—The increment/decrement value may be configurable and/or defined by the host.
6. One Hot with Shift Left or Shift Right—Instead of a static increment/decrement value, the CID may be adjusted with a different increment/decrement each time, following a one hot with shift left or right pattern. For instance, 1, 2, 4, 8, 16, 32, etc.
7. Flexible Multiplier—Instead of a static increment/decrement value, the CID may be adjusted with a different increment/decrement each time using a flexible multiplier. For instance, 1, 3, 9, 27, 81, etc.
8. And the like.

In one embodiment, the command identifier tracker 702 alone or in coordination with the queue manager 700 uses a table 716 to monitor, track, and/or determine what the next CID is based on the last CID. In certain embodiments, logic of the command identifier tracker 702 may determine what the next CID is. "Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

FIG. 7 illustrates examples of SQID, CID (here the last CID successfully received from the host), next CID, and the command identifier allocation model associated with each SQID.

In one embodiment, a host defines a host defined command identifier allocation model 704 when the host sets up the submission completion queue pair with the storage device. In certain embodiments, the host may send only an identifier for the command identifier allocation model to be used from the set of command identifier allocation models 712. In other embodiments, the host may send more details defining, describing, or identifying the command identifier allocation model to be used.

The command identifier tracker 702 then defines the command identifier allocation model to use as the host defined command identifier allocation model 704. This is indicated by the example data in the first row of the table 716. As can be seen from this example the host defined command identifier allocation model 704 is to increment the CID by 2 each time.

In some embodiments, the command identifier tracker 702 may derive the command identifier allocation model based on a storage command history. The command identifier tracker 702 may be configured to monitor, or coordinate with the queue manager 700 to monitor a plurality of storage commands. For example, in one embodiment, five to twenty-five storage commands are tracked my recording the CID for the storage command and the order in which the storage command was serviced. These monitored storage commands serve as the storage command history 714. The command identifier tracker 702 may compare the storage command history 714 or a subset of storage commands in the history and determine or deduce how the CID changed in the past from one storage command to each successive storage command. Once the command identifier tracker 702 detects a pattern that matches the data provided by the storage command history 714, the command identifier tracker 702 may select a derived command identifier allocation model 708 to use that matches the identified pattern. In FIG. 7, the command identifier allocation model associated with the second row, CID=0x0032, is a derived command identifier allocation model 708 that indicates that the CID is decremented by two each time.

Additionally, or in an alternate embodiment, the command identifier tracker 702 may define the command identifier allocation model as a default command identifier allocation model 706 when the host does not provide a command identifier allocation model. "Default command identifier allocation model" refers to a command identifier allocation model that is predefined as the model to be used if a host does not provide, or indicate, which command identifier allocation model to use. The default command identifier allocation model 706 may be predefined. In one embodiment, the default command identifier allocation model 706 is predefined and conforms to an industry convention. For example, the default command identifier allocation model 706 may start CIDs at one and increment by one for each successive CID and roll over to one again after the full number of digits of the command identifier are used. Alternatively, the default command identifier allocation model 706 may be set by a storage device manufacturer. In another embodiment, the default command identifier allocation model 706 may be configurable by an end user.

In some embodiments, the command identifier tracker 702 may derive the command identifier allocation model based on industry convention. In such embodiments, rather than using a host defined command identifier allocation model 704 or default command identifier allocation model 706, the command identifier tracker 702 may predict, forecast, determine, project, or anticipate what command identifier allocation model is most likely being used by the host.

Additionally, or in an alternate embodiment, the command identifier tracker 702 may validate the command identifier allocation model being used (e.g., the default command identifier allocation model 706 or derived command identifier allocation model 708) by using the storage command history 714. In one example, the command identifier tracker 702 may compare CIDs of storage commands in the storage command history 714 with those determined by the command identifier allocation model used for a specific SQID. If the CIDs of the storage command history 714 match those defined as the appropriate next CID using the command identifier allocation model, then the command identifier allocation model is validated. If not, then the command identifier tracker 702 may signal a problem or warning for continued use of a particular command identifier allocation model.

In the case that a Transport Layer Packet (TLP) error occurs, particularly an uncorrectable packet error, the error tracker 710 may detect this condition and alert the queue manager 700. The submission queue fetch error may comprise a PCIe Express Transport Layer Protocol fetch error. "PCIe Express Transport Layer Protocol fetch error" refers to a Transport Layer Packet (TLP) error that occurs during communications using a PCIe express communication protocol.

Figure 8:
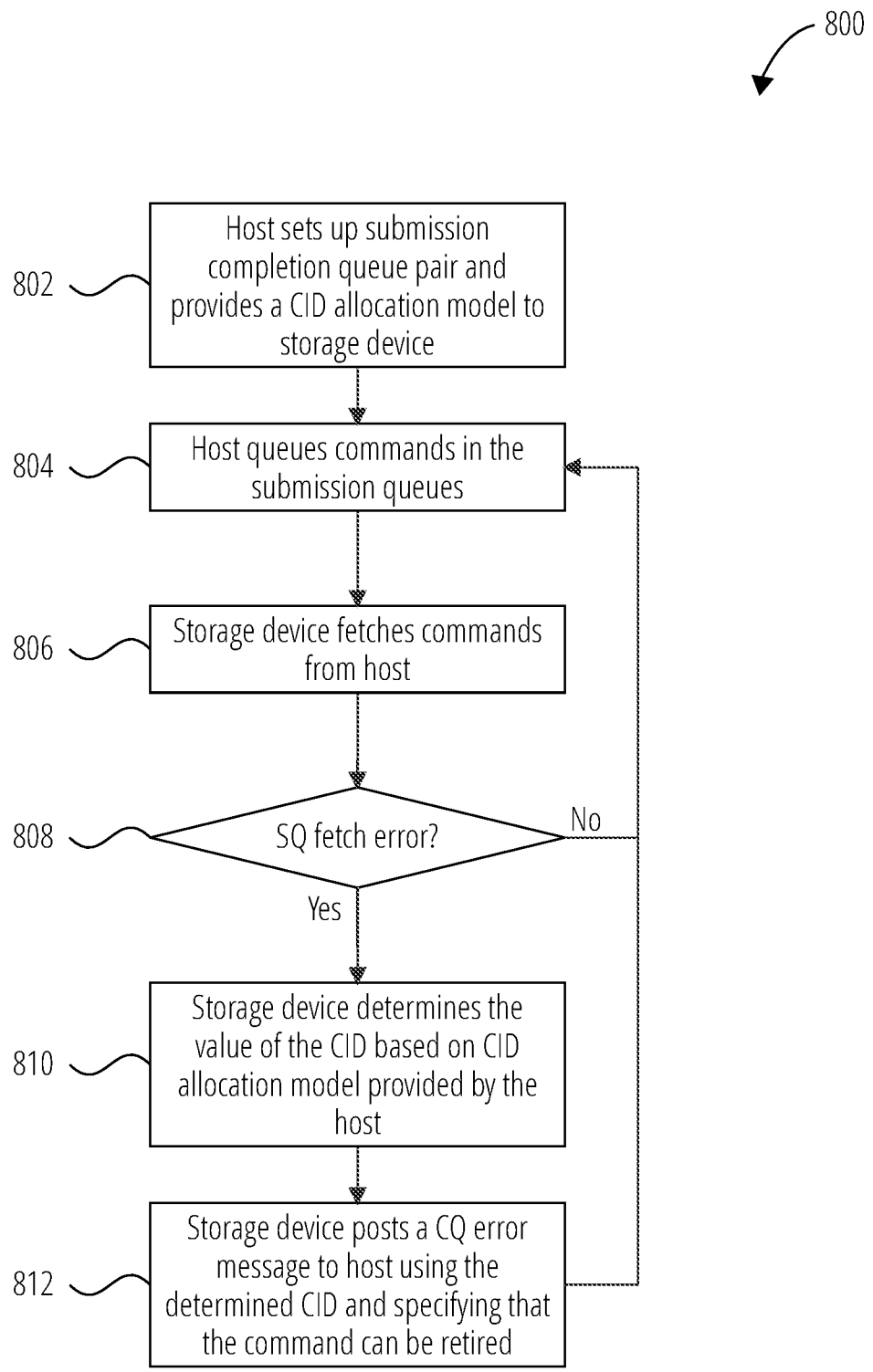
FIG. 8 illustrates a method wherein a host provides a CID allocation model 800 in accordance with one embodiment.

FIG. 8 illustrates a method wherein a host provides a CID allocation model 800 in accordance with one embodiment. Beginning at step 802, the host sets up a submission queue and a completion queue as a submission completion queue pair and provides a command identifier allocation model to the storage device prior to the storage device receiving any commands. The storage device receives a storage command (e.g., an administrative storage command) from the host configured to identify the submission completion queue pair and the command identifier allocation model. In certain embodiments, the host may use a reserved field in the storage command to indicate the command identifier allocation model. In another embodiment, the NVMe protocol may be changed to add a field that includes a command identifier allocation model designation and/or a default command identifier allocation model designation. This allows the storage device to allocate or determine command identifiers for storage commands for the submission completion queue pair.

The storage command may identify a SQID, a starting address for the submission queue in memory, a starting address for the completion queue in memory, and other pertinent information. In some embodiments, the storage command (e.g., an administrative storage command) from the host may be configured to set up the submission queue and completion queue as a submission completion queue pair for storage operations between the host and a storage device, and to associate a default command identifier allocation model with the submission completion queue pair in response to the host failing to designate a command identifier allocation model.

The host queues storage commands in the submission queues (step 804). The storage device attempts to fetch, or fetches, storage commands from the host's submission queues in step 806. These submission queues each have a submission queue identifier (SQID). If no submission queue fetch errors are detected at step 808, the host continues to queue storage commands and the storage device continues to fetch them, following completion steps as necessitated by the configured communication protocol. Alternatively, or in addition, if the submission queue has more storage commands, that method may proceed to step 806 and fetch additional queued storage commands.

In some cases, when attempting to fetch the storage command, the storage device may detect a submission queue fetch error at step 808. When this occurs, the storage device may, at step 810, determine the command identifier (CID) for the storage command associated with the submission queue fetch error (e.g., the storage command that was unsuccessfully fetched) based on the command identifier allocation model provided by the host in step 802.

At step 812, the storage device may post a completion queue (CQ) error message to the host. The completion message may include the SQID and the CID that uniquely identify the storage command of the submission queue associated with the submission queue fetch error. This completion queue (CQ) error message may indicate to the host that the command may be retired, may be resubmitted to the submission queue, or other error handling done.

Figure 9:
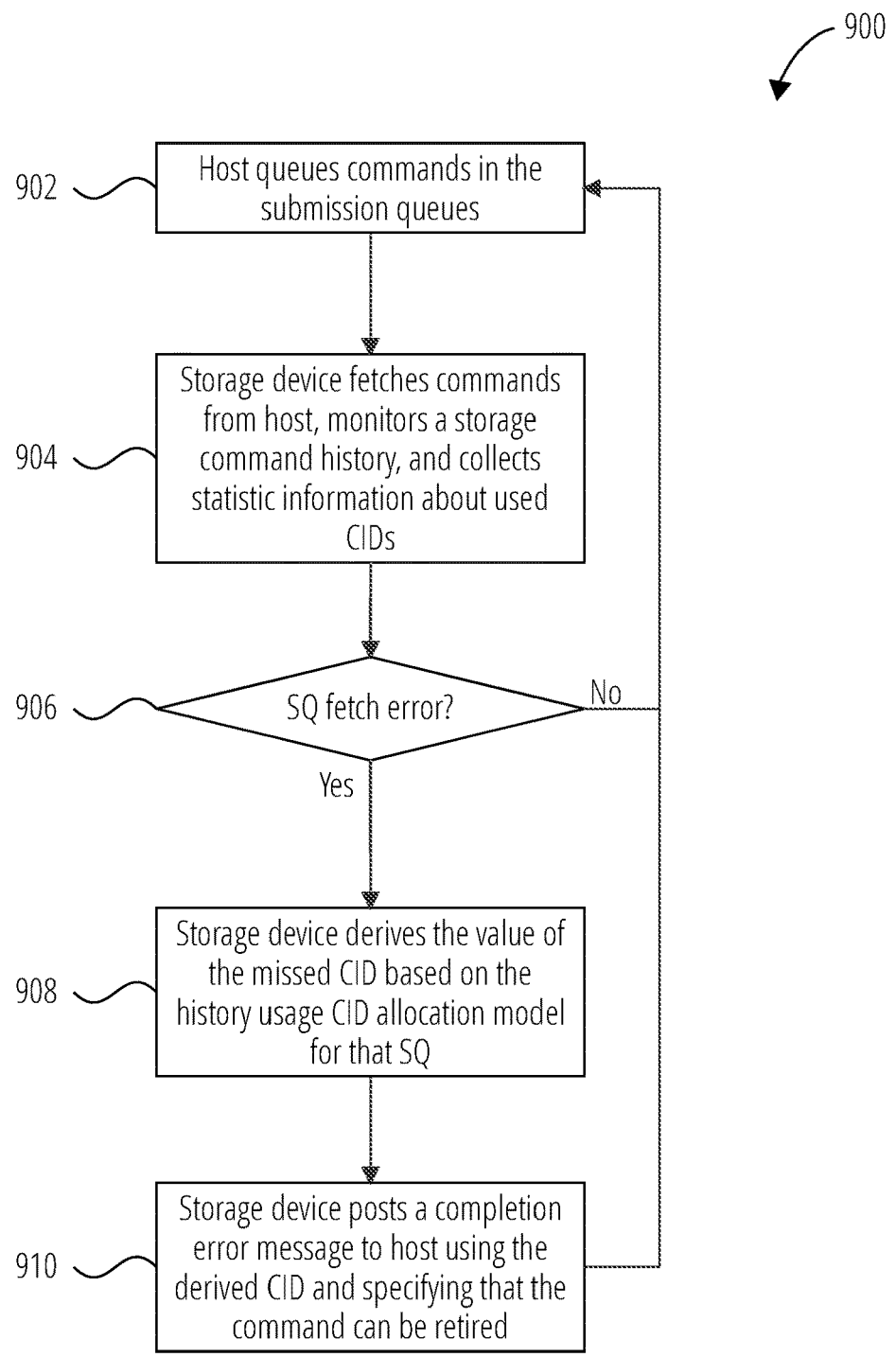
FIG. 9 illustrates a method wherein a CID allocation model is based on a storage command history 900 in accordance with one embodiment.

FIG. 9 illustrates a method wherein a CID allocation model is based on a storage command history 900, in accordance with one embodiment. In step 902, the host queues commands in the submission queues according to the NVMe memory protocol. In step 904, the storage device fetches commands from the host, and in the process, monitors or maintains a storage command history. The storage command history allows the storage device to collect statistic information on CIDs used.

The submission queues each have a submission queue identifier (SQID). If no submission queue fetch errors are detected at step 906, the host continues to queue storage commands and the storage device continues to fetch them, following completion steps as necessitated by the configured communication protocol.

In some cases, when attempting to fetch the storage command, the storage device may detect a submission queue fetch error at step 906. When this occurs, the storage device may, at step 908, determine the command identifier (CID) for the storage command associated with the submission queue fetch error. In one embodiment, the storage device makes this determination based on a command identifier allocation model predicted or derived using the storage command history gathered in step 904. The storage device may then post a completion message such as a completion error message, to the host using the derived/determined CID and the SQID to uniquely identify the storage command of the submission queue associated with the submission queue fetch error. The host may then act on the completion message.

In some embodiments the storage device may determine the command identifier in step 904 based on industry convention. Alternatively, the command identifier allocation model may be derived based on the storage command history monitored in step 904, and command identifiers may be identified based on the derived command identifier allocation model. When the storage device detects a submission queue fetch error while attempting to fetch a storage command from a submission queue of the host having a SQID (step 906), the derived command identifier allocation model may be used in step 908 to derive the value of the missed CID for the storage command associated with the submission queue fetch error. The storage device may then post a completion message to the host at step 910 comprising the SQID and the derived CID to uniquely identify the storage command of the submission queue associated with the submission queue fetch error.

Figure 10:
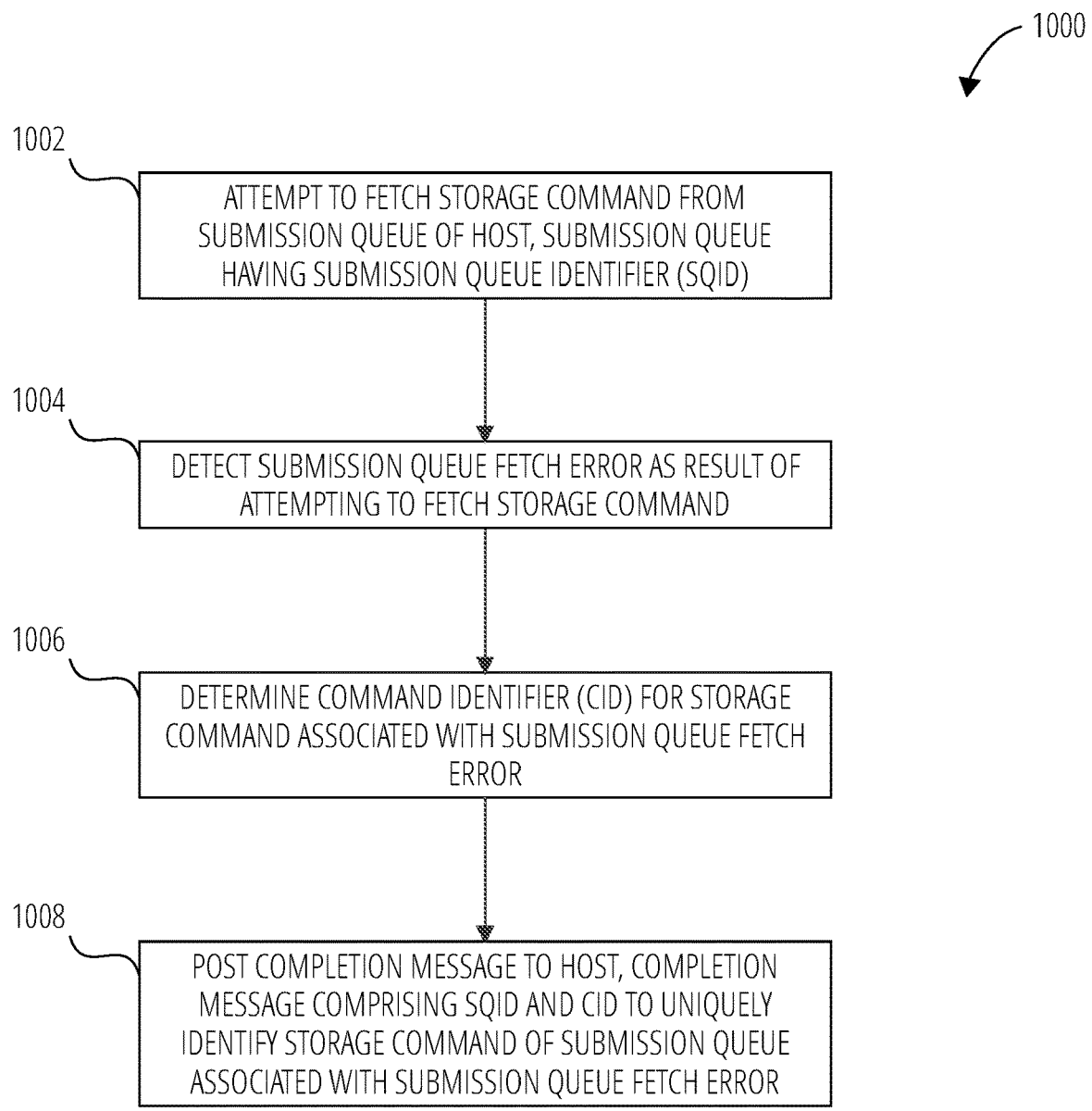
FIG. 10 illustrates a method for recovery from submission queue fetch error 1000 in accordance with one embodiment.

FIG. 10 illustrates a method for recovery from submission queue fetch error 1000 in accordance with one embodiment. In step 1002, the storage device attempts to fetch a storage command from a submission queue of a host. The submission queue has a submission queue identifier (SQID).

In step 1004, the storage device detects a submission queue fetch error as a result of attempting to fetch the storage command. In step 1006, the storage device determines a command identifier (CID) for the storage command associated with the submission queue fetch error.

In step 1008, the storage device posts a completion message to the host. The completion message comprises the SQID and the CID to uniquely identify the storage command of the submission queue associated with the submission queue fetch error.

In some embodiments, the storage device may determine the command identifier for the storage command based on a command identifier allocation model provided by the host. In some embodiments, the completion message includes a completion identifier. "Completion identifier" refers to an identifier that uniquely associates a completion message with a storage command of a particular submission queue. In one embodiment, the completion identifier comprise a combination of a submission queue identifier and a command identifier. The method for recovery from submission queue fetch error 1000 may further comprise generating the completion identifier using the CID and the SQID. The completion message may also act as an error message to the host, thereby informing the host of the submission queue fetch error, while still allowing the storage device to complete the queued storage command.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and Magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed, or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed.

The invention claimed is:

1. An apparatus, comprising:
a non-volatile memory media; and
a storage controller configured to:
    fetch a storage command from a submission queue in a host, the submission queue having a submission queue identifier (SQID);
    determine a submission queue fetch error in response to receiving a Transport Layer Packet (TLP) error as a result of fetching the storage command;
    determine a command identifier (CID) for the storage command associated with the submission queue fetch error based on a command identifier allocation model, wherein the command identifier allocation model is provided to the storage controller by the host prior to the storage controller fetching the storage command; and
    send a completion message to the host, the completion message comprising the SQID and the CID to uniquely identify the storage command of the submission queue associated with the submission queue fetch error, wherein the completion message indicates to the host that the storage command is to be either:
        retired; or
        resubmitted to the submission queue for the controller to fetch.

2. The apparatus of claim 1, wherein storage controller is further configured to derive the command identifier allocation model based on a storage command history.

3. The apparatus of claim 1, wherein storage controller is further configured to predict the command identifier allocation model.

4. A system, comprising:
a host having a submission queue;
a Peripheral Component Interconnect Express (PCIe) bus;

a storage device coupled to the host by way of the PCIe bus, the storage device comprising:

non-volatile memory media; and a storage controller configured to communicate with the host over the PCIe bus using a Non-Volatile Memory express (NVMe) protocol, the storage controller comprising:

a PCIe medium access control (MAC) and physical layer (PHY) interface;

a command fetcher configured to fetch a storage command from the submission queue in the host;

a queue manager configured to manage a submission queue identifier (SQID) and to determine a submission queue fetch error in response to receiving a Transport Layer Packet (TLP) error as a result of fetching the storage command;

a command identifier tracker configured to determine a command identifier (CID) for the storage command associated with the submission queue fetch error, the command identifier based on a command identifier allocation model, wherein the command identifier allocation model is provided to the storage controller by the host prior to the command fetcher fetching the storage command; and wherein the queue manager is configured to post a completion message to the host, the completion message comprising the SQID and the CID and configured to uniquely identify the storage command of the submission queue associated with the submission queue fetch error, wherein the completion message indicates to the host that the storage command is to be either:

retired; or resubmitted to the submission queue for the controller to fetch.

5. The system of claim 4, wherein the host defines the command identifier allocation model when the host sets up a submission queue and a completion queue with the storage device.

6. The system of claim 4, wherein the command identifier tracker defines the command identifier allocation model as a default command identifier allocation model in response to the host failing to define the command identifier allocation model.

7. The system of claim 4, wherein the command identifier tracker is configured to derive the command identifier allocation model based on a storage command history.

8. The system of claim 4, wherein the Transport Layer Packet (TLP) error comprises an uncorrectable packet error.

9. The system of claim 4, wherein the queue manager is configured to retry fetching the storage command in response to the submission queue fetch error.

10. The system of claim 4, wherein the command identifier tracker is configured to monitor a plurality of storage commands and to validate the command identifier allocation model by comparing command identifiers of the plurality of storage commands with corresponding command identifier based on the command identifier allocation model.

11. The system of claim 4, wherein the submission queue fetch error comprises a PCIe Express Transport Layer Protocol fetch error.

12. A method, comprising:

attempting to fetch a storage command from a submission queue in a host, the submission queue having a submission queue identifier (SQID);

receiving a storage command from the host, the storage command configured to set up the submission queue and a completion queue as a submission completion queue pair for storage operations between the host and a storage device and wherein the storage command comprises a command identifier allocation model for use in allocating command identifiers for storage commands for the submission completion queue pair;

detecting a submission queue fetch error as a result of attempting to fetch the storage command;

determining a command identifier (CID) for the storage command associated with the submission queue fetch error based on the command identifier model; and posting a completion message to the host, the completion message comprising the SQID and the CID to uniquely identify the storage command of the submission queue associated with the submission queue fetch error, wherein the completion message indicates to the host that the storage command is to be either:

retired; or resubmitted to the submission queue for to be re-fetched.

13. The method of claim 12, wherein determining the command identifier based on the command identifier model comprises deriving the command identifier based on a storage command history.

14. The method of claim 12, wherein determining the command identifier based on the command identifier model comprises forecasting the command identifier based on an industry convention.

15. The method of claim 12, further comprising:

associating a default command identifier allocation model with the submission completion queue pair, in response to the host failing to designate the command identifier allocation model.

16. The method of claim 12, wherein determining the command identifier for the storage command comprises determining the storage command based on the command identifier allocation model provided by the host.

17. The method of claim 12, wherein the completion message comprises a completion identifier and the method further comprises generating the completion identifier using the CID and the SQID.

* * * * *